US006820278B1

(12) United States Patent
Ellis (10) Patent No.: US 6,820,278 B1
(45) Date of Patent: Nov. 16, 2004

(54) COOPERATIVE TELEVISION APPLICATION SYSTEM HAVING MULTIPLE USER TELEVISION EQUIPMENT DEVICES

(75) Inventor: Michael D. Ellis, Boulder, CO (US)

(73) Assignee: United Video Properties, Inc., Tulsa, OK (US)

(*) Notice: Subject to any disclaimer, the term of this patent is extended or adjusted under 35 U.S.C. 154(b) by 0 days.

(21) Appl. No.: 09/186,598

(22) Filed: Nov. 5, 1998

Related U.S. Application Data (60) Provisional application No. 60/093,862, filed on Jul. 23, 1998.

(51) Int. Cl.[7] .............................................. H04N 7/18
(52) U.S. Cl. ...................................................... 725/80
(58) Field of Search ........................ 725/80, 82; 386/86

(56) References Cited

U.S. PATENT DOCUMENTS

| 4,706,121 A | 11/1987 | Young ........................ 358/142 |
| 5,151,789 A | 9/1992 | Young ........................ 358/194.1 |
| 5,353,121 A | 10/1994 | Young et al. ................. 348/563 |
| 5,479,266 A | 12/1995 | Young et al. ................. 358/335 |
| 5,523,794 A | 6/1996 | Mankovitz et al. .......... 348/460 |
| 5,541,738 A | 7/1996 | Mankovitz .................. 358/335 |
| 5,574,965 A | * 11/1996 | Welmer ...................... 725/151 |
| 5,589,892 A | 12/1996 | Knee et al. .................. 348/731 |
| 5,619,274 A | 4/1997 | Roop et al. .................. 348/461 |
| 5,625,678 A | 4/1997 | Blomfield-Brown ......... 379/93 |
| 5,652,613 A | 7/1997 | Lazarus et al. ................ 348/7 |
| 5,701,383 A | 12/1997 | Russo et al. ................. 386/46 |
| RE35,954 E | 11/1998 | Levine ........................ 380/10 |
| 6,032,202 A | * 2/2000 | Lea et al. ....................... 710/8 |
| 6,163,316 A | * 12/2000 | Killian ........................ 345/721 |
| 6,237,049 B1 | * 5/2001 | Ludtke ........................... 710/8 |
| 6,321,382 B1 | * 11/2001 | Wugofski ..................... 725/59 |

FOREIGN PATENT DOCUMENTS

| EP | 0 535 749 A2 | 4/1993 | ............ H02J/13/00 |
| WO | WO 95/32583 | 11/1995 | .......... H04N/5/445 |
| WO | WO 95/32584 | 11/1995 | ............ H04N/5/78 |
| WO | WO 95/32585 | 11/1995 | ............ H04N/7/10 |
| WO | WO 96/09721 | 3/1996 | .......... H04N/7/025 |
| WO | WO 96/41472 | 12/1996 | ............ H04N/7/10 |
| WO | WO 97/34413 | 9/1997 | .......... H04N/5/445 |
| WO | WO 98/17033 | 4/1998 | ............ H04L/12/28 |

OTHER PUBLICATIONS

RFE (Radio Fersehen Elektronik) 1996 (vol. 45), published in Verlag Texhnik GmbH Berlin München, vol. 9, pp. 28 to 31 and vol. 10, pp. 38 to 40.

* cited by examiner

*Primary Examiner*—Vivek Srivastava
*Assistant Examiner*—Hunter Lonsberry
(74) *Attorney, Agent, or Firm*—Fish & Neave; Laura A. Sheridan (57) ABSTRACT

A cooperative interactive television application system is provided. User television equipment devices are programmed with the cooperative interactive television application. The application determines whether it is running in a system with another device also running the cooperative television application. If other devices are running the cooperative television application, system functionality is dynamically partitioned among the devices. System functions may be removed from or resources disabled on devices when the device is not responsible for performing the function.

80 Claims, 6 Drawing Sheets

COOPERATIVE TELEVISION APPLICATION SYSTEM HAVING MULTIPLE USER TELEVISION EQUIPMENT DEVICES

This application claims the benefit of U.S. provision patent application No. 60/093,862 filed Jul. 23, 1998.

BACKGROUND OF THE INVENTION

This invention relates to video systems, and more particularly, to interactive television application systems that provide for the coordination of system functionality among user television equipment devices.

Traditionally, televisions have been used to provide television programming and advertisements. More recently, interactive television applications have been developed that allow people to use their televisions for other purposes. One application, for example, is an interactive program guide. Interactive program guides allow the user to navigate through television program listings using a remote control. In a typical program guide display, television listings are organized into subsets of listings according to multiple organization criteria and are sorted in various ways. Interactive television applications have also been developed to provide Internet browsing, home shopping, and a broad range of other applications.

Interactive television applications are available which run on analog and digital cable television set-top boxes. Interactive television applications are also available on analog consumer electronics devices, such as televisions. With the advent of digital terrestrial broadcast television, it is anticipated that interactive television applications will be available for digital televisions, digital receivers attached to analog televisions, and analog televisions receivers with suitable processing circuitry.

A large number of households receive their broadcast television signals from cable operators. These consumers may rent or buy a digital cable set-top receiver that provides an interactive television application such as an interactive program guide, Internet access, home shopping, etc. These consumers may also purchase a digital television, such as a high definition television, or a digital television receiver which will convert digital transmissions into analog for a conventional television. The digital television and digital receiver may be capable of providing an interactive television application. Alternatively, consumers may purchase an analog television with suitable processing circuitry making it capable of providing an interactive television application.

In such homes, the television signal will pass through multiple devices with sufficient processing power to provide an interactive television application. With multiple similar applications operating at the same time, there will be conflicting attempts to write information to the television screen, potentially duplicate data streams, conflicting control streams for local devices such as videocassette recorders, and other conflicts.

If one of the applications is disabled, the interactive television application system will suffer from additional inefficiencies. For example, if only one application is running and it is in the television, it will not have access to cable-specific resources, such as an out-of-band data feed. Consequently, the features and functionality of the system might be severely limited. If only one application is running and it is in the set-top box, it will not have access to the television's resources. For example, the set-top box might not have access to resources permitting the application to control the television at its highest resolution.

It is therefore an objective of the present invention to provide interactive television applications that run cooperatively among different user television equipment devices in an interactive television application system.

SUMMARY OF THE INVENTION

This and other objects of the invention are accomplished in accordance with the principles of the present invention by providing an interactive television system that provides for running applications cooperatively among different user television equipment devices in the system.

Application information (e.g., program listings data, Internet links and web pages, shopping data, etc.) may be provided by a data source in a main facility (e.g., a satellite uplink facility). The application information is transmitted to multiple television distribution facilities (e.g., cable system headends, satellite distribution facilities, or broadcast facilities), via a suitable link (e.g., a satellite link). The television distribution facilities distribute the application information (and television programming signals) to user television equipment on which a cooperative interactive television application is implemented. Application information may be provided on a television channel sideband, in the vertical blanking interval of a television channel, using an in-band digital channel, using an out-of-band digital signal, or by any other suitable data transmission technique.

The user television equipment for receiving and processing the application information may include a number of user television equipment devices. For example, the user television equipment may include a set-top box and a television capable of providing various functionability in addition to displaying television programming (e.g., a digital television, an analog television equipped with a suitable digital receiver, or an analog television with suitable processing circuitry). The user television equipment may, for example, be capable of providing an interactive television program guide application, Internet browser, home shopping application, or any other desired application. The set-top box and television are programmed with the cooperative application. The cooperative application implemented on the set-top box and television coordinates system functionality between the devices according to the capabilities of each device.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
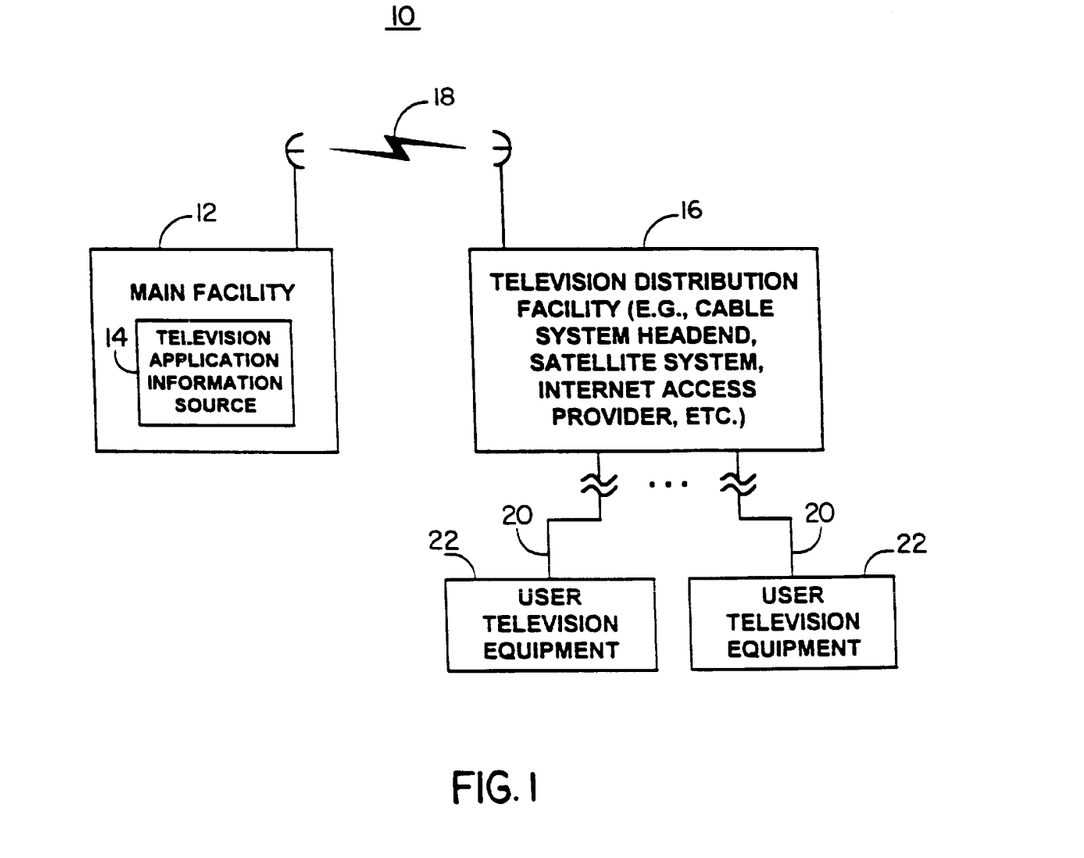
FIG. 1 is a schematic block diagram of a system in accordance with the present invention.

An illustrative system 10 in accordance with the present invention is shown in FIG. 1. Main facility 12 may provide cooperative interactive television application information from television application information source 14 to television distribution facility 16 via communications link 18. Main facility 12 may also provide application information directly to user television equipment 22 over a suitable communications link (not shown). There are preferably numerous television distribution facilities 16, although only one such facility is shown in FIG. 1 to avoid overcomplicating the drawing. Link 18 may be a satellite link, a telephone network link, a cable or fiber optic link, a microwave link, a combination of such links, or any other suitable communications path. If it is desired to transmit video signals over link 18 in addition to data signals, a relatively high 16 bandwidth link such as a satellite link may generally be preferred to a relatively low bandwidth link such as a telephone line. Television distribution facility 16 may be any suitable distribution facility (e.g., a cable system headend, a broadcast distribution facility, a satellite television distribution facility, Internet access provider, etc.).

The cooperative interactive television application information transmitted by main facility 12 to television distribution facility 16 may include any information suitable for the application implemented. If, for example, the interactive television application is a cooperative interactive program guide, the application information may include television program listings data (e.g., program times, channels, titles, and descriptions) and other program data for additional services other than television program listings (e.g., weather information, associated Internet web links, computer software, etc.). If, for example, a cooperative Internet browser application is provided, the application information may include Internet links and Web pages. If, for example, a cooperative home shopping application is provided, the application information may include ordering information, production specifications, etc.

Television distribution facility 16 (or main facility 12) may distribute the application information to multiple users via communications paths 20. Each user has user television equipment 22 for providing interactive television application. Communication paths 20 preferably have sufficient bandwidth to allow television distribution facility 16 to distribute television programming to user television equipment 22. If desired, television programming may be provided over separate communications links (not shown). If main facility 12 provides interactive television application information directly to user television equipment 22, television distribution facility 16 may only distribute television programming to user television equipment 22. Television distribution facility 16 may also receive interactive television application information from a number of main facilities 12. One main facility, for example may provide cooperative Internet browser application information, and another main facility may provide interactive program guide application information. Alternatively, television distribution facility 16 may provide cooperative interactive application information to user television equipment 22 without getting the information from main facility 12. Television distribution facility 16 may for example provide Internet access directly to user television equipment 22, while also providing interactive program guide application information to user television equipment 22 that was received from main facility 12. Any suitable combination of main facilities 12 and television distribution facilities 16 may be used.

Application information may be distributed to user television equipment 22 using any suitable scheme. For example, application information may be provided in a continuous stream or may be transmitted at a suitable time interval (e.g., once per hour). If application information is transmitted continuously, it may not be necessary to store the data locally at user television equipment 22. Rather, user television equipment 22 may extract data "on the fly" as it is needed. If desired, television distribution facility 16 may poll user television equipment 22 periodically for certain information (e.g., pay program account information or information regarding programs that have been purchased and viewed using locally-generated authorization techniques).

For clarity the present invention will be illustrated in connection with a system arrangement in which data is distributed from a main facility to an interactive application on user television equipment via a television distribution facility. Other suitable systems involve systems in which data is distributed to a program guide on user television equipment using other suitable distribution schemes, such as schemes involving data transmission over the Internet or the like. If desired, the interactive application may be implemented using a client-server architecture in which the primary processing power for the application is provided by a server located at, for example, the television distribution facility or the main facility and user television equipment acts as a client processor. If, for example, set-top box 28 has a cable modem for providing Internet access, set-top box 28 may request data from television distribution facility 16.

Figure 2:
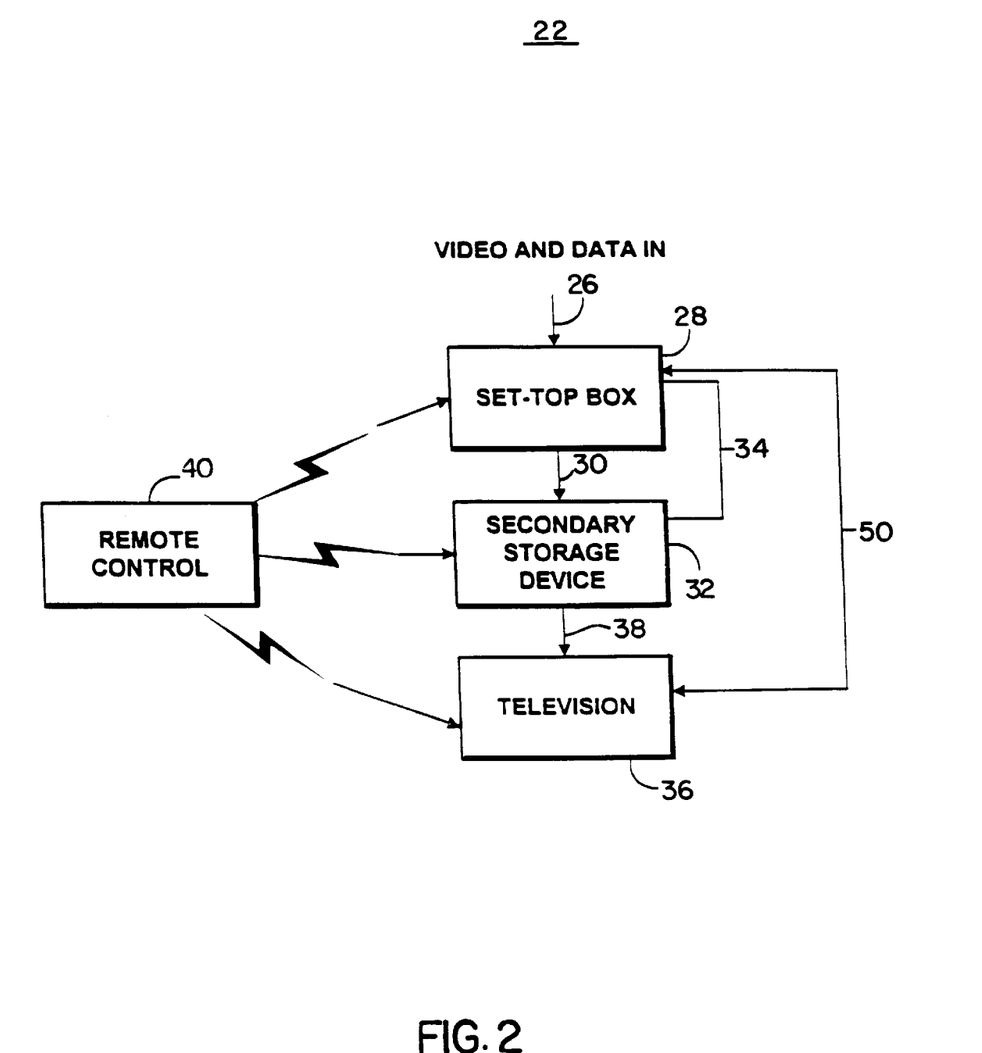
FIG. 2 is a schematic block diagram of illustrative user television equipment in accordance with the present invention.

An illustrative arrangement for user television equipment 22 is shown in FIG. 2. User television equipment 22 of FIG. 2 receives video and data from television distribution facility 16 (FIG. 1) at input 26. User television equipment 22 may include a number of devices which are capable of providing an interactive television application guide, such as set-top box 28 and television 36. During normal television viewing, the user tunes set-top box 28 to a desired television channel. The signal for that television channel is then provided at video output 30. Television 36 may be any television suitable for providing an interactive television application. If television 36 is an analog television, the signal that is provided at output 30 is typically either a radio-frequency (RF) signal output on a predefined channel (e.g., channel 3 or 4) or a demodulated video signal. If television 36 is a digital television or an analog television equipped with a digital receiver, the signal that is provided at output 30 may be a digital signal.

Optional secondary storage device 32 may be used to record programming. Any suitable type of analog or digital program storage device can be used (e.g., a videocassette recorder, a digital video disc (DVD) player with the ability to record DVD discs, hard disk drive, etc.). Program recording and other features may be controlled by set-top box 28 using control path 34, or by the interactive television application implemented in television 36. If secondary storage device 32 is a videocassette recorder, for example, a typical control path 34 involves the use of an infrared transmitter coupled to the infrared receiver in the videocassette recorder that normally accepts commands from a remote control such as remote control 40. Remote control 40 may be used to control set-top box 28, secondary storage device 32, and television 36.

Television 36 receives RF, demodulated video signals, or digital signals from secondary storage device 32 via communications path 38. The video signals on communications path 38 may either be generated by secondary storage device 32 when playing back a prerecorded storage medium (e.g., a videocassette or a recordable digital video disc), may be passed through secondary storage device 32 from set-top box 28, may be provided directly to television 36 from set-top box 28 if secondary storage device 32 is not included in user television equipment 22, or may be received directly by television 36 from input 26. During normal television viewing, the video signals provided to television 36 correspond to the desired channel to which the user has tuned with set-top box 28. Data and control information is passed between set-top box 28 and television 36 over communications path 50. Communications path 50 may be any suitable digital bus, such as a bus using the IEEE 1394 standard. Preferably, communications path 50 is a cable in the home of the user that does not involve transmission of cooperative television application information outside the home.

Figure 3A:
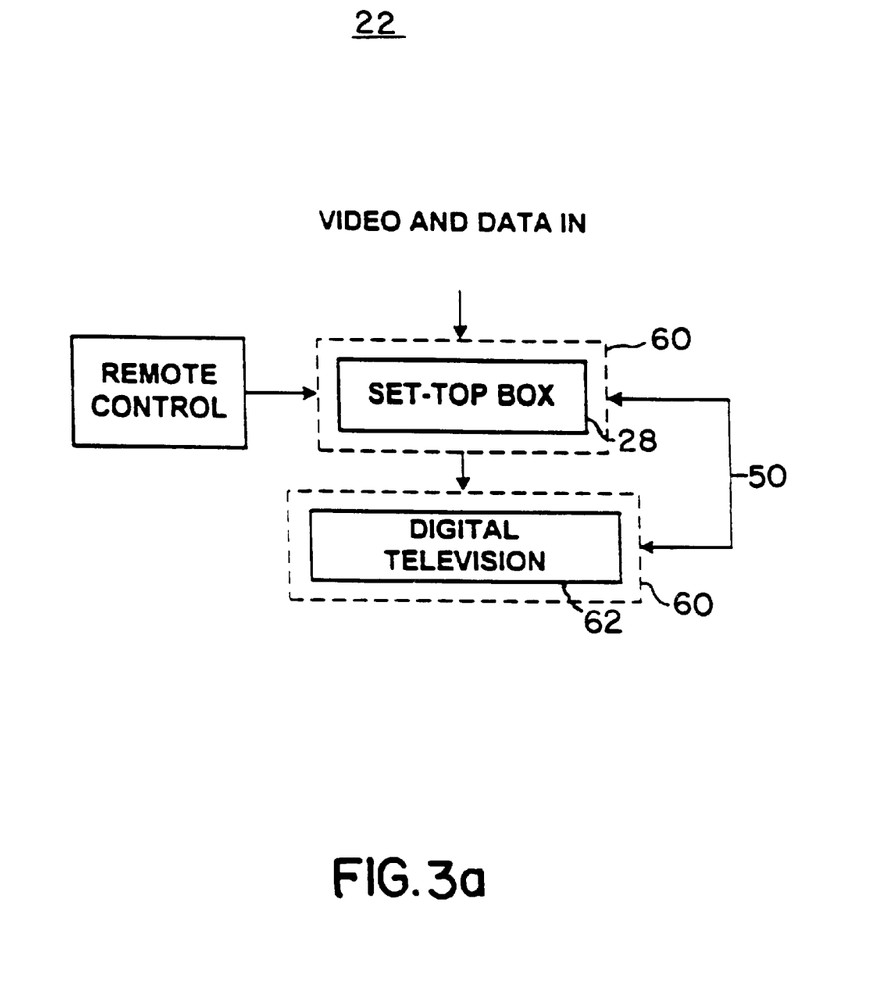
FIGS. 3a–3c are a generalized schematic block diagram of portions of the illustrative television equipment of FIG. 2.
Figure 3B:
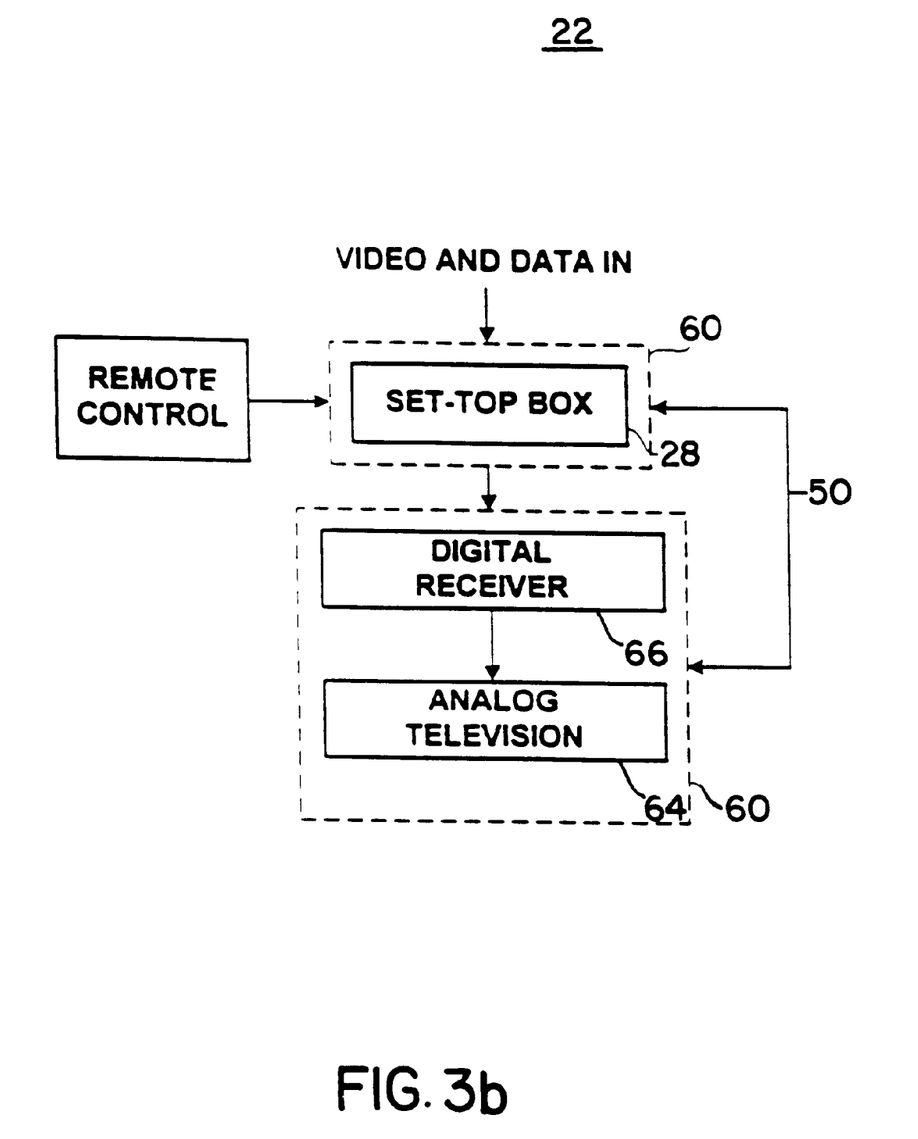
Figure 3C:
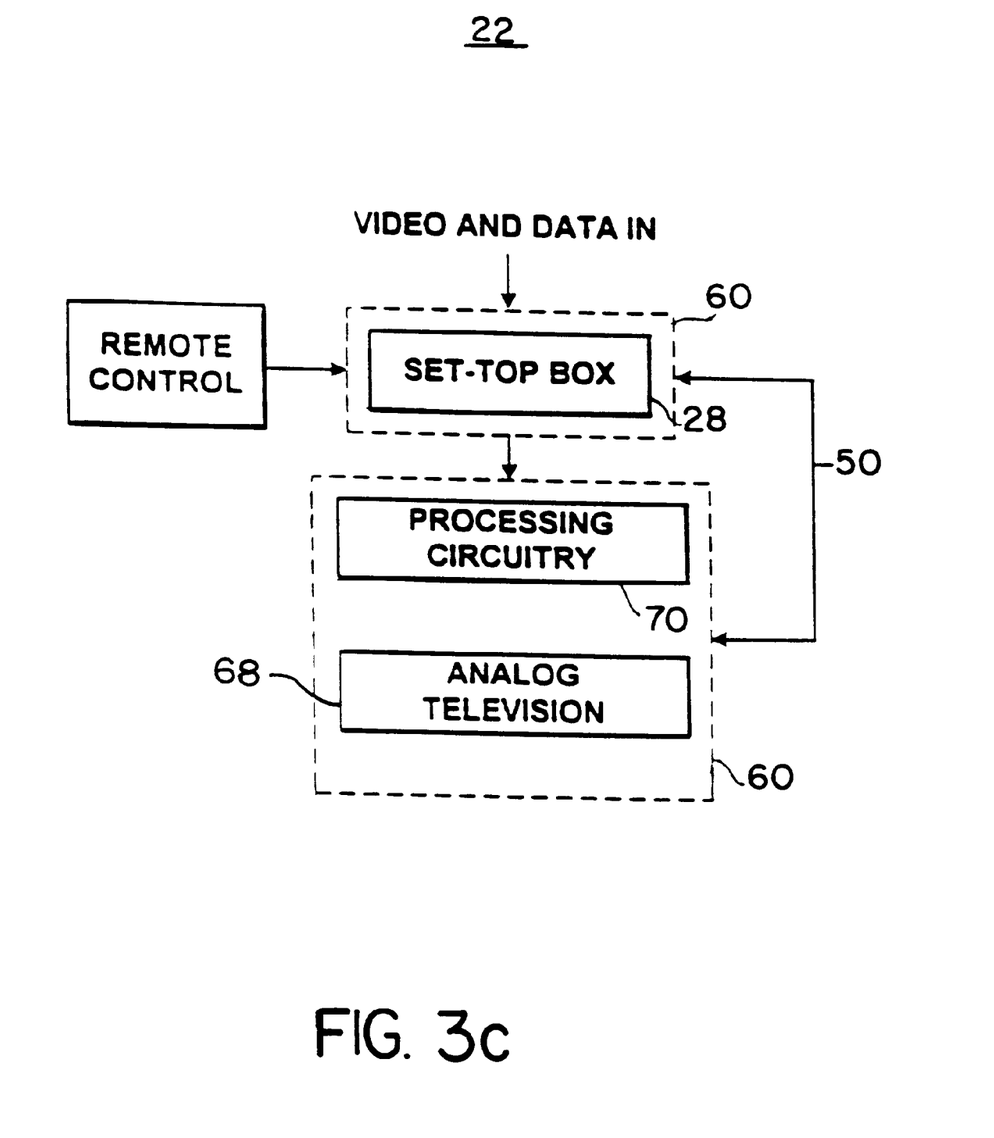

More detailed embodiments of user television equipment 22 (FIG. 2) are shown in FIGS. 3a, 3b, and 3c. As shown in FIGS. 3a, 3b, and 3c, user television equipment 22 contains a number of user television equipment devices 60 suitable for supporting an interactive program guide. As shown in FIG. 3a, one user television equipment device 60 may be set-top box 28. Another user television equipment device 60 may be digital television 62. If desired, the user television equipment 22 may include more than two user television equipment devices 60.

User television equipment 22 of FIG. 3b has two user television equipment devices 60. One user equipment device 60 is made up of set-top box 28. The other user television equipment device 60 is made up of analog television 64 and a suitable digital receiver 66.

User television equipment 22 of FIG. 3c also has two user television equipment devices 60. One user television equipment device 60 is made up of set-top box 28. The other user television equipment device 60 is made up of analog television 68 and processing circuitry 70.

To access the features of the cooperative interactive television application, the user may instruct the cooperative application implemented on user television equipment 22 to generate a main menu or a desired display screen for display on television 36 (FIG. 2). Each user television equipment device in user television equipment 22 may be responsible for performing a different system function (e.g., generating and displaying the display screens, compiling program listings, user interface control, display control, tuner control, Internet access, etc.) How the functions are assumed or assigned by/to each device is discussed below.

Cooperative interactive television application system functions may be partitioned among the user television equipment devices in any suitable fashion. The cooperative interactive television application may, for example run on a number of user television equipment devices in the system. Other suitable approaches may include running portions of the cooperative interactive television application on a number of user television devices, or programming different user television equipment devices to perform different system functions for the cooperative interactive television application, or to perform different portions of overall system functionality.

User television equipment devices 60 may be programmed with the cooperative application by any suitable means. For example, set-top box 28 may be programmed at manufacture, at a warehouse prior to distribution, at the cable system prior to install, at the point of sale, in the home via an out-of-band data stream, in the home via data transmitted over a broadcast channel, or by any other suitable technique. Digital television 62 (FIG. 3a), digital receiver 66 (FIG. 3a), and processing circuitry 70 (FIG. 3c) may be programmed at manufacture, at a warehouse prior to distribution, at the point of sale, in the home via an out-of-band data stream, in the home via data transmitted over a broadcast channel, or by any other suitable technique. If either device is expected to be used in a particular environment (e.g., one where user television equipment 22 includes a digital television), then the device may be manufactured with only necessary program guide application elements and the hardware necessary to perform those functions, or, some of the capabilities of the device may be removed and assumed to be present in another user television equipment device.

Once user television equipment devices 60 are programmed with the cooperative application (or necessary devices), the applications determine whether they will be running independently or cooperatively on user television equipment 22 based on the equipment used. The applications may determine various system variables, for example, what type of device it is running on, what its capabilities are, and what other devices are present. If, for example, a cooperative application determines that it is running on a set-top box and that there is no suitable television also loaded with a cooperative application or capable of running one (e.g., a digital television, an analog television with appropriate digital receiver, or any analog television with suitable processing circuitry), then the cooperative application will run by itself, perhaps with reduced functionality. If, for example, a cooperative application determines that it is running on a suitable television and determines that there is no other suitable device running the cooperative application, then it will similarly run independently and with reduced functionality.

If cooperative applications are running on two user television equipment devices 60 (e.g., set-top box 28 and digital television 62 of FIG. 3a), system functions may be dynamically partitioned between the two user television equipment devices. The applications running on both devices may accomplish this partitioning of responsibilities by negotiating responsibilities over communications path 50 using any suitable protocol. Which device handles what function will depend on the capabilities of the two devices. For example, digital television 62 may take responsibility for accepting commands from remote control 40. Set-top box 28 may then ignore commands from remote control 40, accepting commands from digital television 62 over communications path 50. While digital television 62 may control the display, either device may control the tuner with digital television 62 controlling decoding of any digital signals.

User television equipment 22 may contain multiple tuners within user television equipment devices 60. For example, set-top box 28 and television 62 may both have tuners that are capable of tuning to a stream of information independently of each other. Thus, one user television equipment device may obtain application information, and the other used to obtain television programming signals. Each user television equipment device 60 may also have multiple tuners. For example, set-top box 28 may have multiple tuners. Multiple tuners may, for example, allow set-top box 28 to tune to a stream of program guide data, Internet web pages, home shopping information, etc., that is provided over a television channel, while television 62 tunes to television programming. Both devices may tune to television programming to provide a picture within a picture (PIP), if desired.

User television equipment 22 may accept an out-of-band data feed from television distribution facility 16 (FIG. 1). In this case, set-top box 28 may take responsibility for collecting a trickle data feed, while either device may take responsibility for collecting high speed in-band data. Responsibility for data storage is determined by the applications based on the amount of memory available in each device, as well as any mass storage devices that may be available.

Preferably, the cooperative application is well modularized. Each module of the application may be capable of sending and receiving commands and data both within the same device and to the other device. This may be accomplished using a command and data router in the application.

The cooperative applications running on user television equipment devices 60 may perform application functions as master and slave. Set-top box 28 and digital television 62 (FIG. 3a) may negotiate over communications path 50 which device takes which role according to the capabilities of each device. For example, the user interface master may be television 36 because digital television 62 may control television programming display, display screen display (e.g., program guide display screen display, web page display, on-screen home shopping order screen display, etc.), and remote control 40. Which device acts as the data collection master may depend on the availability of data streams and storage. For example, set-top box 28 may perform the function of data collection master if there is an out-of-band data stream.

Figure 4:
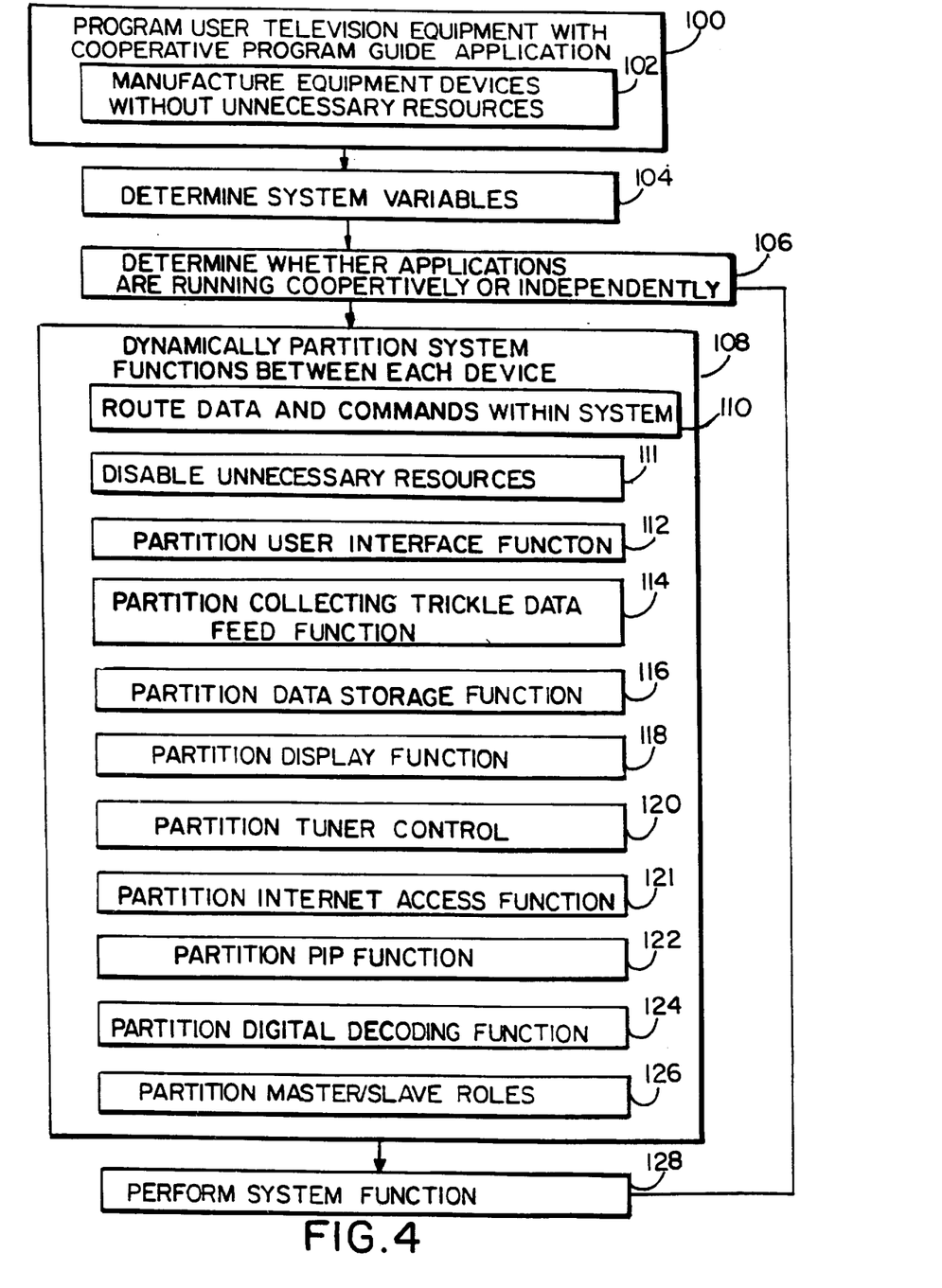
FIG. 4 is a flow chart of steps involved in the operation of the present invention.

Steps involved in operating the cooperative interactive television application system of the present invention are set forth in FIG. 4. At step 100, user television equipment 22 is programmed with the cooperative television application (or only the television equipment devices necessary for the expected environment). Step 100 may contain sub-step 102 at which devices of television equipment 22 (e.g., set-top box 28 and television 36), are manufactured without resources because they are unnecessary in light of the anticipated user environment.

At step 104, the cooperative interactive television application of each device of user television equipment 22 (e.g., set-top box 28 and digital television 62) determines various system variables, which may include determining the type of device it is running on, what the capabilities of the device are, and what other devices may be present.

At step 106, the cooperative interactive television application determines whether it will be running in independent or cooperative mode. If it is loaded on the only device capable of providing a cooperative interactive television application, then the cooperative interactive television application will run in independent mode and perform system functions accordingly at step 128. If, however, there are multiple devices capable of running the cooperative interactive television system application, the application may proceed to step 108 at which system functions are dynamically partitioned among the devices.

Step 108 may include sub-step 110 for routing data and commands within the system (e.g., if a command and data router is used in the application). Step 108 may also include sub-steps for partitioning a number of system functions. Step 108 may include sub-step 111, for example, at which the resources on a user television equipment device are disabled for devices not performing those functions. The function of receiving commands from remote control 40 (FIG. 2), for example, may be disabled on set-top box 28 because the function will be handled by digital television 62. For example, the functions of accepting commands from the user interface (e.g., remote control 40), collecting a trickle data feed, collecting in-band data, data storage, display, controlling the tuner, Internet access, generating a picture within a picture and digital decoding may be partitioned at sub-steps 112–124, respectively.

Step 108 may also include sub-step 126 at which master/slave relationships are partitioned between the set-top box 28 and digital television 62 if the devices will be performing system functions as master and slave. System functions are performed by the devices according to how they are partitioned (if at all) at step 128.

The foregoing is merely illustrative of the principles of this invention and various modifications can be made by those skilled in the art without departing from the scope and spirit of the invention.

What is claimed is:

1. A system in which interactive television application information is displayed for users by a cooperative interactive television application implemented on user television equipment, the system comprising:

a plurality of user television equipment devices contained in the user television equipment on which the cooperative interactive television application is implemented;

a communications path for connecting one of the user television equipment devices to another one of the user television equipment devices to support communications between the two devices; and means for partitioning system functions for the cooperative interactive television application among the user television equipment devices in the user television equipment to avoid conflicts that would otherwise result from multiple user television equipment devices performing the same system function at the same time for the cooperative interactive television application.

2. The system defined in claim 1 further comprising means for programming the user television equipment devices with the cooperative interactive television application.

3. The system defined in claim 1 wherein the user television equipment devices have a plurality of resources, the system further comprising means for manufacturing one of the user television equipment devices without resources that would be responsible for performing the system functions that will be performed by the resources of another of the user television equipment devices in the system.

4. The system defined in claim 1 further comprising means for determining one or more system variables selected from the group consisting of: type of user television equipment devices the cooperative interactive television application is running on, capabilities of each user television equipment device, and type of other user television equipment devices that are present in the system.

5. The system defined in claim 1 wherein a first portion of the cooperative interactive television application is implemented on a first one of the user television equipment devices and a second portion of the cooperative interactive television application is implemented on a second one of the user television equipment devices, the system further comprising:

means for determining whether the first and second portions are running independently or cooperatively; and means for running the first and second portions on the first and second user television equipment devices independently or cooperatively in response to the determination made by the means for determining, thereby avoiding the conflicts.

6. The system defined in claim 1 further comprising means for routing data and commands between the user television equipment devices.

7. The system defined in claim 1 wherein the system functions partitioned among the user television equipment devices by the means for partitioning are one or more system functions selected from the group consisting of: user interface control, collecting a trickle data feed, collecting in-band data, data storage, requesting data, display control, tuner control, controlling secondary storage, Internet access, generating a picture within a picture and digital decoding.

8. The system defined in claim 1 wherein the user television equipment devices comprise a plurality of resources, the system further comprising means for disabling the resources in one of the user television equipment devices when the resources of that user television equipment device were responsible for performing system functions that have been partitioned to at least one other of the user television equipment devices by the means for partitioning.

9. The system defined in claim 1 further comprising means for partitioning master/slave roles for performing system functions between the user television equipment devices programmed with the cooperative interactive television application determining, thereby avoiding the conflicts.

10. The system defined in claim 1 wherein one of the user television equipment devices on which the cooperative interactive television application is implemented is a set-top box.

11. The system defined in claim 1 wherein one of the user television equipment devices on which the cooperative interactive television application is implemented is a digital television receiver.

12. The system defined in claim 1 wherein one of the user television equipment devices on which the cooperative interactive television application is implemented is a television.

13. The system defined in claim 1 wherein the cooperative interactive television application is a cooperative interactive television program guide application.

14. The system defined in claim 1 wherein the cooperative interactive television application is cooperative Internet browser.

15. The system defined in claim 1 wherein the cooperative interactive television application is a cooperative home shopping application.

16. A system in which interactive television application information is displayed for users by a cooperative interactive television application implemented on user television equipment, the system comprising:

a first user television equipment device on which a first portion of the cooperative interactive television application is implemented;

a second user television equipment device on which a second portion of the cooperative interactive television application is implemented; and a communications path for connecting the first user television equipment device and the second user television equipment device to support communications between the two devices;

wherein the first and second portions of the cooperative interactive television applications avoid conflicts with each other that would otherwise result from performing the same system function at the same time for the cooperative interactive television application.

17. The system defined in claim 16 wherein the first and second user television equipment devices have resources responsible for performing system functions for the cooperative interactive television application, the system further comprising:

means for disabling the resources of the first user television equipment device that are responsible for performing system functions that are performed by the resources of the second user television equipment device, thereby avoiding the conflicts.

18. The system defined in claim 16 wherein the first and second user television equipment devices each have resources responsible for performing system functions for the cooperative interactive television application, the system further comprising:

means for manufacturing the first user television equipment device without resources responsible for performing system functions that are performed by the resources of the second user television equipment device.

19. The system defined in claim 16 wherein the user television equipment devices have resources responsible for performing system functions for the cooperative interactive television application, the system further comprising means for disabling the resources in one of the user television equipment devices when the resources of that user television equipment device were responsible for performing system functions that have been partitioned to at least one other of the user television equipment devices by means for partitioning, thereby avoiding the conflicts.

20. The system defined in claim 16 wherein the first user television equipment device is a set-top box.

21. The system defined in claim 16 wherein the first user television equipment device is a digital television receiver.

22. The system defined in claim 16 wherein the first user television equipment device is a television.

23. The system defined in claim 16 wherein the cooperative interactive television application is a cooperative interactive television program guide application.

24. The system defined in claim 16 wherein the cooperative interactive television application is a cooperative Internet browser.

25. The system defined in claim 16 wherein the cooperative interactive television application is a cooperative home shopping application.

26. A system in which television program application information is displayed for users by a cooperative interactive television application implemented on user television equipment, the system comprising:

a first user television equipment device programmed to perform a portion of system functions for the cooperative interactive television application;

a second user television equipment device programmed to perform a portion of system functions for the cooperative interactive television application; and a communications path for connecting the first user television equipment device and the second user television equipment device to support communications between the two devices;

wherein the first and second user television equipment device are programmed to avoid conflicts with each other that would otherwise result from performing the same system function at the same time for the cooperative interactive television application.

27. The system defined in claim 26 wherein the first and second user television equipment devices are programmed to perform one or more system functions selected from the group consisting of: user interface control, collecting a trickle data feed, collecting in-band data, data storage, requesting data, display control, tuner control, controlling secondary storage, Internet access, generating a picture within a picture, and digital decoding.

28. The system defined in claim 26 wherein the first user television equipment device is a set-top box.

29. The system defined in claim 26 wherein the first user television equipment device is a digital television receiver.

30. The system defined in claim 26 wherein the first user television equipment device is a television.

31. The system defined in claim 26 wherein the cooperative interactive television application is a cooperative interactive television program guide application.

32. The system defined in claim 26 wherein the cooperative interactive television application is a cooperative Internet browser.

33. The system defined in claim 26 wherein the cooperative interactive television application is a cooperative home shopping application.

34. A system in which interactive television application information is displayed for users by a cooperative interactive television application implemented on user television equipment, the system comprising:

a plurality of user television equipment devices contained in the user television equipment;

means for determining whether the cooperative interactive television application is to run independently on one of the user television equipment devices or cooperatively on more than one of the user television equipment devices; and means for running the cooperative interactive television application on the user television equipment devices independently, or cooperatively to avoid conflicts that would otherwise result from multiple user television equipment devices performing the same system function at the same time for the cooperative interactive television application, in response to the determination made by the means for determining.

35. The system defined in claim 34 wherein one of the user television equipment devices is a set-top box.

36. The system defined in claim 34 wherein one of the user television equipment devices is a digital television receiver.

37. The system defined in claim 34 wherein one of the user television equipment devices is a television.

38. The system defined in claim 34 further comprising means for determining one or more system variables selected from the group consisting of: type of user television equipment devices the cooperative interactive television application is running on, capabilities of each user television equipment device, and type of other user television equipment devices that are present in the system.

39. The system defined in claim 34 wherein the cooperative interactive television application is a cooperative interactive television program guide application.

40. The system defined in claim 34 wherein the cooperative interactive television application is a cooperative Internet browser.

41. The system defined in claim 34 wherein the cooperative interactive television application is a cooperative home shopping application.

42. A method in which interactive television application information is displayed for users by a cooperative interactive television application implemented on user television equipment, the method comprising the steps of:

programming a plurality of user television equipment devices having a plurality of resources with the cooperative interactive television application;

connecting one of the user television equipment devices to another one of the user television equipment devices to support communications between the two devices; and partitioning system functions for the cooperative interactive television application among the user television equipment devices of the user television equipment to avoid conflicts that would otherwise result from multiple user television equipment devices performing the same system function at the same time for the cooperative interactive television application.

43. The method defined in claim 42 further comprising the step of removing features from the user television equipment devices that will be performed by another of the user television equipment devices in the system.

44. The method defined in claim 42 further comprising the step of determining one or more system variables selected from the group consisting of: type of user television equipment devices the cooperative interactive television application is running on, capabilities of each user television equipment device, and type of other user television equipment devices that are present in the system.

45. The method defined in claim 42 further comprising the steps of:

determining whether a first portion of the cooperative interactive television application implemented on a first one of the user television equipment devices and a second portion of the cooperative interactive television application implemented on a second one of the user television equipment devices are running independently or cooperatively; and running the first and second portions independently or cooperatively in response to the determination, thereby avoiding the conflicts.

46. The method defined in claim 42 further comprising the step of routing data and commands between the user television equipment devices.

47. The method defined in claim 42 wherein the system functions partitioned among the user television equipment devices are one or more system functions selected from the group consisting of: user interface control, collecting a trickle data feed, collecting in-band data, data storage, requesting data, display control, tuner control, controlling secondary storage, Internet access, generating a picture within a picture, and digital decoding.

48. The method defined in claim 42 further comprising the step of manufacturing one of the user television equipment devices without resources when the resources of that user television equipment device were responsible for performing system functions partitioned to at least one other of the user television equipment devices.

49. The method defined in claim 42 further comprising the step of partitioning master/slave roles for performing system functions between the user television equipment devices programmed with the cooperative interactive television application, thereby avoiding the conflicts.

50. The method defined in claim 42 wherein the step of programming a plurality of user television equipment devices with the cooperative interactive television application comprises the step of programming a set-top box with the cooperative interactive television application.

51. The method defined in claim 42 wherein the step of programming a plurality of user television equipment devices with the cooperative interactive television application comprises the step of programming a digital television receiver with the cooperative interactive television application.

52. The method defined in claim 42 wherein the step of programming a plurality of user television equipment devices with the cooperative interactive television application comprises the step of programming a television with the cooperative interactive television application.

53. The method defined in claim 42 wherein the step of programming a plurality of user television equipment devices with the cooperative interactive television application comprises the step of programming the plurality of user television equipment devices with a cooperative interactive television program guide application.

54. The method defined in claim 42 wherein the step of programming a plurality of user television equipment devices with the cooperative interactive television application comprises the step of programming the plurality of user television equipment devices with a cooperative Internet browser.

55. The method defined in claim 42 wherein the step of programming a plurality of user television equipment devices with the cooperative interactive television application comprises the step of programming the plurality of user television equipment devices with a cooperative home shopping application.

56. A method in which interactive television application information is displayed for users by a cooperative interactive television application implemented on user television equipment, the method comprising the steps of:
programming a first user television equipment device with a first portion of the cooperative interactive television application;
programming a second user television equipment device with a second portion of the cooperative interactive television application; and
connecting the first user television equipment device and the second user television equipment device to support communications between the two devices;
wherein the first and second portions of the cooperative interactive television applications avoid conflicts with each other that would otherwise result from performing the same system function at the same time for the cooperative interactive television application.

57. The method defined in claim 56 wherein the first and second user television equipment devices have resources which are responsible for performing system functions for the interactive television application, the method further comprising the step of manufacturing the first user television equipment device without resources which are responsible for performing system functions performed by the resources of the second user television equipment device.

58. The method defined in claim 56 wherein the first and second user television equipment devices have resources which are responsible for performing system functions for the cooperative interactive television application, the method further comprising the step of disabling the resources of the first user television device that are responsible for performing system functions that are performed by the second user television equipment device, thereby avoiding the conflicts.

59. The method defined in claim 56 wherein the step of programming a first user television equipment device with a first portion of the cooperative interactive television application comprises the step of programming a set-top box with the first portion of the cooperative interactive television application.

60. The method defined in claim 56 wherein the step of programming a first user television equipment device with a first portion of the cooperative interactive television application comprises the step of programming a digital television receiver with the first portion of the cooperative interactive television application.

61. The method defined in claim 56 wherein the step of programming a first user television equipment device with a first portion of the cooperative interactive television application comprises the step of programming a television with the first portion of a cooperative interactive television application.

62. The method defined in claim 56 wherein the step of programming a first user television equipment device with a first portion of the cooperative interactive television application comprises the step of programming a first user television equipment device with a first portion of a cooperative interactive television program guide application.

63. The method defined in claim 56 wherein the step of programming a first user television equipment device with a first portion of the cooperative interactive television application comprises the step of programming the first user television equipment device with a first portion of a cooperative Internet browser.

64. The method defined in claim 56 wherein the step of programming a first user television equipment device with a first portion of the cooperative interactive television application comprises the step of programming a first user television equipment device with a first portion of a cooperative home shopping application.

65. A method in which television program listings data is displayed for users by a cooperative interactive television application implemented on user television equipment, the method comprising:
programming a first user television equipment device to perform a portion of system functions for the cooperative interactive television application; and
programming a second user television equipment device to perform a portion of system functions for the cooperative interactive television application; and
connecting the first user television equipment device and the second user television equipment device to support communications between the two devices;
wherein the first and second portions of the cooperative interactive television applications avoid conflicts with each other that would otherwise result from performing the same system function at the same time for the cooperative interactive television application.

66. The method defined in claim 65 further comprising the step of programming the first and second user television equipment devices to perform one or more system functions selected from the group consisting of: user interface control, collecting a trickle data feed, collecting in-band data, data storage, requesting data, display control, tuner control, controlling secondary storage, Internet access, generating a picture within a picture, and digital decoding.

67. The method defined in claim 65 wherein the step of programming a first user television equipment device to perform a portion of system functions for the cooperative interactive television application comprises the step of programming a set-top box to perform a portion of system functions for the cooperative interactive television application.

68. The method defined in claim 65 wherein the step of programming a first user television equipment device to perform a portion of system functions for the cooperative interactive television application comprises the step of programming a digital television receiver to perform a portion of system functions for the cooperative interactive television application.

69. The method defined in claim 65 wherein the step of programming a first user television equipment device to perform a portion of system functions for the cooperative interactive television application comprises the step of programming a television to perform a portion of system functions for the cooperative interactive television application.

70. The method defined in claim 65 wherein the step of programming a first user television equipment device to perform a portion of system functions for the cooperative interactive television application comprises the step of programming the first user television equipment device to perform a portion of system functions for a cooperative interactive television program guide application.

71. The method defined in claim 65 wherein the step of programming a first user television equipment device to perform a portion of system functions for the cooperative interactive television application further the step of programming the first user television equipment device to perform a portion of system functions for a cooperative Internet browser.

72. The method defined in claim 65 wherein the step of programming a first user television equipment device to perform a portion of system functions for the cooperative interactive television application comprises the step of programming the first user television equipment device to perform a portion of system functions for a cooperative home shopping application.

73. A method in which interactive television application information is displayed for users by a cooperative interactive television application implemented on user television equipment having a plurality of user television equipment devices, the method comprising the steps of:

determining whether the cooperative interactive television application is to run independently on one of the user television equipment devices or cooperatively on more than one of the user television equipment devices; and running the cooperative interactive television application on the user television equipment devices independently, or cooperatively to avoid conflicts that would otherwise result from multiple user television equipment devices performing the same system function at the same time for the cooperative interactive television application, in response to the determination made by the means for determining.

74. The method defined in claim 73 further comprising the step of determining one or more system variables selected from the group consisting of: type of user television equipment devices the cooperative interactive application is running on, capabilities of each user television equipment device, and type of other user television equipment devices that are present in the system.

75. The method defined in claim 73 wherein one of the user television equipment devices is a set-top box and the method further comprises the step of programming the set-top box with the cooperative interactive television application.

76. The method defined in claim 73 wherein one of the user television equipment devices is a digital television receiver and the method further comprises the step of programming a digital television receiver with the cooperative interactive television application.

77. The method defined in claim 73 wherein one of the user television equipment devices is a television and the method further comprises the step of programming the television with the cooperative interactive television application.

78. The method defined in claim 73 wherein the method further comprises the step of programming the plurality of user television equipment devices with a cooperative interactive program guide application.

79. The method defined in claim 73 wherein the method further comprises the step of programming the plurality of user television equipment devices with a cooperative Internet browser.

80. The method defined in claim 73 wherein the method further comprises the step of programming the plurality of user television equipment devices with a cooperative home shopping application.

* * * * *